US008366865B2

(12) United States Patent
Terfloth et al.

(10) Patent No.: US 8,366,865 B2
(45) Date of Patent: Feb. 5, 2013

(54) NONREACTIVE THERMOPLASTIC HOT MELT ADHESIVES BASED ON METALLOCENE-CATALYTICALLY MANUFACTURED POLYOLEFINS

(75) Inventors: Christian Terfloth, Detmold (DE); Felix Starck, Detmold (DE); Peter Brückner, Detmold (DE)

(73) Assignee: Jowat AG, Detmold (DE)

( * ) Notice: Subject to any disclaimer, the term of this patent is extended or adjusted under 35 U.S.C. 154(b) by 683 days.

(21) Appl. No.: 11/912,648

(22) PCT Filed: Mar. 10, 2006

(86) PCT No.: PCT/EP2006/002225
§ 371 (c)(1),
(2), (4) Date: Oct. 25, 2007

(87) PCT Pub. No.: WO2006/114160
PCT Pub. Date: Nov. 2, 2006

(65) Prior Publication Data
US 2008/0190541 A1    Aug. 14, 2008

(30) Foreign Application Priority Data
Apr. 28, 2005  (DE) .......................... 10 2005 020 205

(51) Int. Cl.
*B29C 65/00* (2006.01)
*B31B 1/60* (2006.01)
*B32B 37/00* (2006.01)
*C04B 37/00* (2006.01)
*C08F 283/00* (2006.01)
*C08G 73/02* (2006.01)

(52) U.S. Cl. .......................... 156/325; 156/60; 525/540

(58) Field of Classification Search .................... 156/60, 156/325; 525/540
See application file for complete search history.

(56) References Cited

U.S. PATENT DOCUMENTS
6,300,398 B1 * 10/2001 Jialanella et al. ............. 524/275
2002/0198341 A1   12/2002 Takahashi FOREIGN PATENT DOCUMENTS
EP    1 046 664 A    10/2000
WO    WO 97/15636 A   5/1997

OTHER PUBLICATIONS

English translation of the Preliminary Report on Patentability from PCT/EP2006/002225.

* cited by examiner

*Primary Examiner* — Michael Orlando
(74) *Attorney, Agent, or Firm* — Edward E. Sowers; Brannon Robinson PC

(57) ABSTRACT

The invention relates to an adhesive system which is based on a non-reactive thermoplastic adhesive melt. The adhesive melt (A) contains a mixture of at least two metallocene-catalytically produced copolymers which are different from each other, and which are based on at least two a-olefins, whereby the copolymers of the mixture, which are different from each other, have different melt indices (MFIs); (B) optionally, at least one additional polymer; and (C) optionally, at least one resin and/or at least one wax. The inventive adhesive system is particularly suitable for use in the wood and furniture industry, e.g. for covering profiles or for gluing edges, in particular, by comparing copolymer adhesives to EVA melt adhesives which are used in a traditional manner, and the system enables considerably lower application temperatures to be used, and at the same time exhibiting improved adhesion capacity.

23 Claims, No Drawings

NONREACTIVE THERMOPLASTIC HOT MELT ADHESIVES BASED ON METALLOCENE-CATALYTICALLY MANUFACTURED POLYOLEFINS

CROSS-REFERENCES TO RELATED APPLICATIONS

This application is a National Stage filing of International Application PCT/EP2006/002225, filed Mar. 10, 2006, claiming priority to German Application No. 10 2005 020 205.5 filed Apr. 28, 2005, entitled "NONREACTIVE THERMOPLASTIC HOT MELT ADHESIVES BASED ON METALLOCENE-CATALYTICALLY MANUFACTURED POLYOLEFINS". The present application claims priority to PCT/EP2006/002225, and to German Application No. 10 2005 020 205.5, and both references are expressly incorporated by reference herein, in their entireties.

BACKGROUND OF THE INVENTION

The present invention relates to an adhesive system based on a nonreactive thermoplastic hot melt adhesive, particularly for use in wood processing and furniture processing, with the use of metallocene-catalytically manufactured copolymers as well as to their use particularly in wood processing and furniture processing, particularly for purposes of profile coating or edge bonding, and also in other application fields (for example, in the transport industry and construction industry, in the textile industry, in the general assembly sector, etc.). Synonyms for the term hot melt adhesive that are used below are "hotmelt," "thermal fusion adhesive," or similar terms.

According to the state of the art, EVA copolymers (i.e., ethylene/vinyl acetate copolymers) dominate the market portion of thermoplastic hot melt adhesives (hotmelts) by far. The largest application field for thermoplastic hot melt adhesives is the paper industry and packaging industry, and, in this connection, particularly for the purposes of so-called cardboard closure. In addition, ethylene vinyl acetate-based thermoplastic hot melt adhesive systems are used in wood processing and furniture processing.

The EVA-based hot melt adhesives that are used generally in wood processing and furniture processing, however, require, on the one hand, relatively high processing temperatures, namely temperatures generally in the range of 180-210° C., which is detrimental when gluing heat-sensitive substrates. On the other hand, systems based on ethylene/vinyl acetate copolymers (EVA) are limited insofar as increasing vinyl acetate contents decrease the compatibility with other formulation components of the system, although they generally improve the elastomer performance.

Occasionally, polyolefin-based systems are also used. For example, linear low density polyethylene (LLDPE) and low density polyethylene (LDPE) are used as base polymers in a multitude of hot melt adhesives, particularly for box gluing and cardboard gluing. Linear low density polyethylene and low density polyethylene, however, present the drawback, when used as base materials or raw materials for adhesives, that, due to their crystalline nature, they tend to be very stiff and present unsatisfactory low temperature properties. For the rest, such adhesives present a limited hot adhesive capacity, which leads to low glue dissolution temperatures. In particular, due to the poor oil retention capacity, polyethylene also presents a limited usability as a base polymer in the formulation of contact adhesives.

Moreover, hot melt adhesive compositions that are known from the state of the art contain polyolefin waxes and are manufactured with the help of metallocene catalysts (see, for example, DE 103 23 617 A1). Such adhesive systems are indeed suitable for the paper industry and packaging industry, but not for use in wood processing and furniture processing, particularly due to the only relatively small cohesion, and the poor initial adhesion, and also because of the relatively short open times or processing times.

In principle, the hot melt adhesives based on metallocene-catalytically manufactured polyolefins known from the state of the art cannot be used in the present target sectors, particularly not in wood processing and furniture processing, because they present insufficient cohesion with respect to the initial strength and final strength, and only insufficient open times or processing times, so that they cannot be used at all, for example, for gluing processes in the wood industry and furniture industry.

The present invention is therefore based on the problem of providing an adhesive system based on a nonreactive thermoplastic hot melt adhesive, which at least partially avoids, or at least partially decreases the above described disadvantages of the state of the art.

An additional problem of the present invention is to produce an adhesive system based on a nonreactive thermoplastic hot melt adhesive, which is particularly suited for use in wood processing and furniture processing, and also in other application fields.

BRIEF SUMMARY

The invention relates to an adhesive system which is based on a non-reactive thermoplastic adhesive melt. The adhesive melt (A) contains a mixture of at least two metallocene-catalytically produced copolymers which are different from each other, and which are based on at least two a-olefins, whereby the copolymers of the mixture, which are different from each other, have different melt indices (MFIs); (B) optionally, at least one additional polymer; and (C) optionally, at least one resin and/or at least one wax. The inventive adhesive system is particularly suitable for use in the wood and furniture industry, e.g. for covering profiles or for gluing edges, in particular, by comparing copolymer adhesives to EVA melt adhesives which are used in a traditional manner, and the system enables considerably lower application temperatures to be used, and at the same time exhibiting improved adhesion capacity.

DETAILED DESCRIPTION

For the purposes of promoting an understanding of the disclosure, reference will now be made to the embodiments described herein. It will nevertheless be understood that no limitation of the scope of the disclosure is thereby intended, such alterations and further modifications in the described embodiments being contemplated as would normally occur to one skilled in the art to which the disclosure relates.

The applicant has now found unexpectedly that a suitable adhesive system based on a nonreactive thermoplastic hot melt adhesive can be obtained, if one formulates this adhesive system with a mixture of at least two different metallocene-catalytically manufactured copolymers with different melt-flow indexes (MFIs), optionally in combination with additional polymers, resins and/or waxes.

The object of the present invention is thus an adhesive system based on a nonreactive thermoplastic hot melt adhesive, particularly for use in wood processing and furniture processing, where the hot melt adhesive contains (A) a mixture of at least two mutually different metallocene-catalytically manufactured copolymers in each case based on at least two α-olefins, where the mutually different copolymers of the mixture present different melt-flow indexes (MFIs);

(B) optionally at least one additional polymer; and (C) optionally at least one resin and/or at least one wax.

The applicant has found unexpectedly that the above described problem can be solved by the above defined adhesive system.

One must also consider the following additional characteristic feature of the invention, namely that, in the context of the present invention, metallocene-catalytically manufactured copolymers, in each case based on at least two α-olefins, are used; similar copolymers manufactured by Ziegler/Natta catalysis, on the other hand, are not suitable without restriction because hot melt adhesives based on Ziegler/Natta-catalytically manufactured polyolefins, as used, for example, in the sector of the wood industry and furniture industry, present indeed high heat resistances, but also relatively high processing temperatures, so that they cannot be used without restriction with respect to heat-sensitive substrates.

One must also consider the following additional characteristic feature of the invention, namely that in the context of the adhesive system according to the present invention, a mixture is used of at least two mutually different metallocene-catalytically manufactured copolymers, each on the basis of at least two α-olefins, which differ—at least—in their melt-flow indexes (MFIs). In this way, an adhesive system can be obtained, which presents improved hot melt adhesive properties, particularly a good cohesion and adhesion with improved initial adhesion and higher viscosity with, simultaneously, lower usage or processing temperatures, and increased open times in comparison to hot melt adhesives for the paper sector and packaging sector, which are known from the state of the art and constructed on the same polymer base. This is discussed in greater detail below. This can be achieved only by the mixture, as provided specifically according to the invention, of two different metallocene-catalytically manufactured copolymers with different melt-flow indexes (MFIs).

The application and processing properties of the adhesive system according to the invention, furthermore, can be managed or optimized, so that optionally at least one additional polymer (B) and/or optionally at least one resin and/or at least one wax (C) are incorporated into the adhesive system according to the invention. However, this measure is optional.

The term "copolymers based on at least two α-olefins," as used according to the invention, should be understood in a very broad meaning, and it denotes copolymers made of two, three, four, etc., different α-olefins, i.e., this term is not restricted to polymers that are based only on at least two α-olefins. Thus, in other words, all the metallocene-catalytically manufactured copolymers of the mixture (A) are constructed on the basis of at least two α-olefins, i.e., by the copolymerization of two or more different α-olefins.

The term "mutually different metallocene-catalytically manufactured copolymers," as used according to the invention, refers to the fact that the mutually different copolymers differ at least in their melt-flow indexes (MFIs). In addition, however, other physicochemical properties can also be different, as described below (for example, chemical composition, densities, melting points, glass transition temperatures, molecular masses or molecular weights, etc.).

As metallocene-catalytically manufactured copolymers based on at least two α-olefins, in the mixture (A), in general, in each case metallocene-catalytically manufactured copolymers of ethylene or propylene, preferably ethylene, with at least one preferably linear α-olefin are used; in the case of ethylene, a $C_3$-$C_{20}$ α-olefin is used particularly as linear α-olefin, where the $C_3$-$C_{20}$ α-olefin can be chosen particularly from the group of propylene, isobutylene, 1-butene, 1-pentene, 1-hexene, 1-heptene, 4-methyl-1-pentene and 1-octene, preferably 1-octene, while in the case of propylene, a $C_4$-$C_{20}$ α-olefin is used particularly, where the $C_4$-$C_{20}$ α-olefin can be chosen particularly from the group of isobutylene, 1-butene, 1-pentene, 1-hexene, 1-heptene, 4-methyl-1-pentene, and 1-octene. It is preferred according to the invention, to use as metallocene-catalytically manufactured copolymers based on at least two α-olefins in the mixture (A), in general, in each case metallocene-catalytically manufactured copolymers of ethylene with at least one preferably linear α-olefin, particularly $C_3$-$C_{20}$ α-olefin, preferably as defined above.

According to an embodiment that is particularly preferred according to the invention, the metallocene-catalytically manufactured copolymers of the mixture (A) are in each case metallocene-catalytically manufactured copolymers of ethylene with 1-octene, which differ in their melt-flow indexes (MFIs).

In case the mixture (A) contains more than two mutually different copolymers, at least two of these different copolymers present different melt-flow indexes (MFIs). However, it is also possible for all the copolymers of the mixtures to present different melt-flow indexes (MFIs).

Particularly well performing adhesive systems can be obtained if the different melt-flow indexes (MFIs) of the different copolymers of the mixture (A) differ from each other by at least 100 g/10 min, particularly by at least 200 g/10 min, preferably by at least 300 g/10 min, particularly preferably by at least 400 g/10 min, and most particularly preferably by at least 600 g/10 min. All the melt-flow indexes indicated here and in the entire following text are according to ISO 1133 or ASTM D 1238 at 190° C. and under 2.16 kg, unless explicitly indicated otherwise.

According to a special embodiment of the present invention, the mixture (A) contains metallocene-catalytically manufactured copolymers (called "copolymers I") with melt-flow indexes MFI≧500 g/10 min, particularly MFI>600 g/10 min, preferably MFI>700 g/10 min, on the one hand, and metallocene-catalytically manufactured copolymers (called "copolymers II") with melt-flow indexes MFI≦100 g/10 min, particularly MFI<50 g/10 min, preferably MFI<30 g/10 min, on the other hand (all the data on melt-flow indexes is according to ISO 1133 or ASTM D 1238 at 190° C. and under 2.16 kg load, as indicated above). The weight-related copolymers I/copolymers II quantity ratio varies advantageously in the range from 10:1 to 1:2, particularly 7:1 to 1:1, preferably 6:1 to 5:1. Such an adhesive system according to the present invention has particularly good application properties: as a result, the viscosity properties and the mechanical properties are clearly improved; in particular, such a system is also suitable with gluing of temperature-sensitive substrates. Moreover, such an adhesive system according to the present invention presents a particularly good initial strength during the gluing as well as excellent heat resistance, as the applicant discovered unexpectedly and documented in embodiments.

According to an advantageous embodiment of the present invention, the mutually different copolymers of the mixture (A) differ—besides having different melt-flow indexes (MFIs)—also in additional physicochemical properties, particularly in their densities; viscosities, particularly Brookfield viscosities; glass transition temperatures; melting points (DSC); molecular masses, etc.

In general, the copolymers of the mixture (A) are chosen in such a way that the density of all the copolymers of the mixture (A) is lower than 0.900 g/cm³, particularly lower than 0.890 g/cm³, preferably lower than 0.880 g/cm³, where the density data are according to ASTM D 791. It is preferred for the density of all the copolymers of the mixture (A) to be in the range of 0.840-0.900 g/cm³, particularly 0.850-0.890 g/cm³.

In general, the different copolymers of the mixture (A) are chosen in such a way that the mutually different copolymers of the mixture (A) present—besides different melt-flow indexes (MFIs)—also different densities; in case the mixture (A) contains more than two mutually different copolymers, then, according to this embodiment, at least two of the different copolymers present different densities. In this embodiment of the present invention, it is preferred for the different densities of the mutually different copolymers of the mixture (A) to differ from each other by at least $1.0 \times 10^{-3}$ g/cm³, particularly by at least $2.0 \times 10^{-3}$ g/cm³, advantageously by at least $3.0 \times 10^{-3}$ g/cm³, where the density data are according to ASTM D 791. The different densities can differ from each other particularly by up to $4.0 \times 10^{-3}$ g/cm³ or even more.

According to an advantageous embodiment of the present invention, the mutually different copolymers of the mixture (A)—besides their differences in the melt-flow indexes (MFIs) and optionally in the densities—can also differ in their viscosities, particularly Brookfield viscosities. According to this embodiment of the present invention, the mutually different copolymers of the mixture (A) present, besides the above-mentioned differences, also different Brookfield viscosities, where, in case the mixture (A) contains more than two mutually different copolymers, at least two of the different copolymers present different Brookfield viscosities. In general, the Brookfield viscosities of the mutually different copolymers of the mixture (A), in this embodiment, at 177° C. differ from each other by at least 1000 mPa·s, particularly by at least 2000 mPa·s, preferably by at least 3000 mPa·s, particularly preferably by at least 5000 mPa·s, where the Brookfield viscosity data are determined according to ASTM D 1084. The differences in the Brookfield viscosities of the different copolymers of the mixture (A) can be up to 8000 mPa·s or even more (ASTM D 1084).

According to a special embodiment of the present invention, the mixture (A) can comprise copolymers with Brookfield viscosities at 177° C. of more than 10,000 mPa·s, particularly more than 12,000 mPa·s, preferably more than 15,000 mPa·s, on the one hand, and copolymers with Brookfield viscosities at 177° C. of less than 10,000 mPa·s, particularly less than 9000 mPa·s, preferably less than 8500 mPa·s, on the other hand, where the Brookfield viscosity data are according to ASTM D 1084.

According to a special embodiment of the present invention, the mutually different copolymers of the mixture (A) can additionally present different glass transition temperatures $T_g$, where, in case the mixture (A) contains more than two mutually different copolymers, at least two of the different copolymers can present different glass transition temperatures $T_g$. In this special embodiment of the invention, the different glass transition temperatures $T_g$ of the mutually different copolymers of the mixture (A) differ from each other by at least 2° C., particularly by at least 3° C., preferably by at least 5° C.

Furthermore—besides the other above-mentioned differences—the mutually different copolymers of the mixture (A) can present different melting points (DSC=Differential Scanning Calorimetry), where, in case the mixture (A) contains more than two mutually different copolymers, in this embodiment at least two of the different copolymers can present different melting points (DSC). In this embodiment, the different melting points of the mutually different copolymers of the mixture (A) differ from each other in general by at least 2° C., particularly by at least 3° C., preferably by at least 5° C., particularly preferably by at least 7° C.

In this special embodiment of the present invention, the mixture (A), according to a special configuration, can contain copolymers with melting points (DSC) of more than 65° C., particularly more than 66° C., preferably more than 67° C., on the one hand, and copolymers with melting points (DSC) of less than 65° C., particularly less than 64° C., on the other hand.

Moreover, the mutually different copolymers of the mixture (A) can present different molecular weights, where, in case the mixture (A) contains more than two mutually different copolymers, at least two of the different copolymers present different molecular masses or molecular weights. In this embodiment, the mean molecular masses by number $M_n$ of the mutually different copolymers of the mixture (A) differ in general from each other by at least 1000, particularly by at least 2000, preferably by at least 4000, particularly preferably by at least 5000 or more.

Regarding the copolymers of the mixture (A), one can use in general random metallocene-catalytically manufactured copolymers based on at least two α-olefins, provided they satisfy the above-mentioned conditions, particularly different melt-flow indexes (MFIs), and optionally additional different physicochemical properties, as described above.

It is particularly advantageous if all the copolymers of the mixture (A) present a polydispersity $M_w/M_n$ of 1.5-2.5. Moreover, it is advantageous if all the copolymers of the mixture (A) present mean molecular masses by weight $M_w$ in the range of 2000-100,000 g/mol.

In the scope of the adhesive system according to the present invention, for example; usable metallocene-catalytically manufactured copolymers of the aforementioned type that are suitable according to the invention are available from the Dow Chemical Company, USA under the name "Affinity®" (for example, Affinity® GA 1900, Affinity® GA 1950 and Affinity® EG 8200) and "Versify®" (for example, Versify® DE 4000.01, Versify® DE 4200.01 and Versify® DE 4003.01), as well as from the company Exxon Mobil under the name "Exact® 4038."

Insofar as the quantity of the above-mentioned mixture (A) of the different copolymers in the adhesive system according to the invention is concerned, it can vary within broad ranges. In general, the hot melt adhesive contains the mixture (A) of the different copolymers, with respect to the hot melt adhesive, in quantities of 25-100 wt %, particularly 30-90 wt %, preferably 40-80 wt %, particularly preferably 60-70 wt %. Nevertheless, depending on the application or the individual case, it may be necessary to deviate from the above-mentioned quantity ranges.

As far as the quantity of optionally present additional polymer (B) in the adhesive system according to the invention is concerned, it can also vary within broad ranges. In general, the hot melt adhesive contains the additional polymer (B), with respect to the hot melt adhesive, in quantities of 0.001-30 wt %, particularly 0.01-25 wt %, preferably 1-25 wt %. Nevertheless, depending on the application or the individual case, it may be necessary to deviate from the above-mentioned quantity ranges.

As far as the optionally present additional polymer of the component (B) is concerned, it can be chosen particularly from the group of preferably amorphous poly-α-olefins, thermoplastic polyurethanes, ethylene/(meth)acrylate copolymers, and ethylene/vinyl acetate copolymers as well mixtures thereof.

As far as the quantity of optionally present wax and/or resin (C) in the adhesive system according to the invention is concerned, this quantity as well can vary within broad ranges. In general, the hot melt adhesive contains the resin and/or the wax (C), with respect to the hot melt adhesive, in quantities of 0.001-50 wt %, particularly 0.01-40 wt %, preferably 1-30 wt %. Nevertheless, depending on the application or the individual case, it may be necessary to deviate from the above-mentioned quantity ranges.

As far as the optionally present wax of the component (C) is concerned, it can be chosen particularly from the group of synthetic waxes, particularly polyolefin waxes, preferably optionally micronized polypropylene waxes; natural waxes, particularly plant, animal or mineral waxes, as well as chemically modified waxes (for example, maleic acid anhydride-grafted waxes, such as, for example, Licomont® AR 504 from the company Clariant); and mixtures of the above-mentioned waxes. An example of a wax that can be used according to the invention is, for example, the micronized polypropylene wax sold by Degussa AG, Marl, under the name "Vestowachs® A 616."

As far as the optionally present resin of the component (C) is concerned, it can be chosen from the group of optionally modified, particularly optionally hydrogenated hydrocarbon resins, such as, aliphatic, aromatic or aliphatic-aromatic hydrocarbon resins, and optionally modified terpene resins, as well as natural resin esters, such as, rosin esters and tall oil resin esters. It is particularly preferred to use hydrocarbon resins based on aromatic, partially or fully hydrogenated resins; in general, the tolerance or compatibility of the hydrocarbon resin with the metallocene-catalytically manufactured copolymers increases with the degree of hydrogenation of these resins. Aromatic hydrocarbon resins that are suitable according to the invention can be, for example, products from the so-called TM, TK and TN series of the company Rutgers Chemicals, Duisburg. Examples of partially and fully hydrogenated hydrocarbon resins that are usable according to the invention are, for example, the types of the 5000 series of the company Exxon Mobil, USA. In addition, it is possible to incorporate in the adhesive system according to the invention, as aliphatic-aromatic resins that are usable according to the invention, additional phenol-modified terpene resins, for example, from the ZT series of the company Arizona Chemical, USA. As natural resin esters, rosin esters and tall oil resin esters are used particularly; the product "Sylvatac® RE 100 S" of the company Arizona Chemical, USA, is an example of a tall oil resin ester that is usable according to the invention.

By incorporating the components (B) and/or (C) in the adhesive system according to the invention, it is possible to control or adjust in a targeted manner, the application properties of the adhesive system according to the invention on the basis of a nonreactive thermoplastic hot melt adhesive, and thus to tailor its production, so to speak. In particular, this possibility can be used to set in a targeted manner the adhesion and cohesion properties, particularly in view of an improved initial adhesion, as well as other properties, such as, for example, the processing or application temperatures, the viscosities, the open times, etc. For example, the addition of resin can be carried out to control or optimize the adhesion properties. In each case, it is within the scope of the abilities of a person skilled in the art to choose the additives concerned in the appropriate quantities.

In addition to the above-mentioned components (A), as well as optionally (B) and/or (C), the adhesive system according to the invention can also contain other ingredients and/or additives. Such ingredients or additives can be chosen particularly from the group of stabilizers, aging protection agents, UV stabilizers, softeners, fillers, catalysts and/or solvents. Here, substances can be used that in themselves are known to the person skilled in the art.

As stabilizers and aging protection agents, those based on phenols or hydroxyphenyl compounds have been found to be particularly appropriate, such as, for example, octadecyl-3-(3,5-di-tert-butyl-4-hydroxyphenyl)propionate (for example, Ciba® IRGANOX® 1076 from Ciba Specialty Chemicals, Inc., USA) or, on the other hand, trisnonylphenyl phosphate (TNPP) (for example, Ciba® IRGAFOS® TNPP from Ciba Specialty Chemicals, Inc., USA).

The viscosity of the adhesive system according to the invention can be varied or adjusted over wide ranges. In general, the adhesive or the hot melt adhesive according to the present invention presents a viscosity (Brookfield viscosity) at 160° C. of 5000-120,000 mPa·s (measured with Brookfield thermosel; see also the above-mentioned ASTM D 1084). By the selection of the components (A) as well as optionally (B) and/or (C) and their corresponding quantities, the viscosities can be adjusted in a targeted manner with respect to the application: for example, while for the application in the area of profile coating, adhesive systems with a viscosity in the range of generally 5000-40,000 mPa·s are used, for the purposes of edge bonding, for example, viscosities in the range of 30,000-120,000 mPa·s are produced, in each case with respect to 160° C. Similar EVA-based melt glues, on the other hand, require clearly higher processing temperatures in the range of 180-210° C. to achieve the same viscosity properties.

After application and cooling, followed by 24-h storage, the adhesive system according to the invention, or the hot melt adhesive according to the invention, leads to excellent strength properties. Thus, the adhesive system according to the invention or the hot melt adhesive according to the invention presents a maximum tensile strength, which is determined according to DIN 53455, after coating or application, followed by 24-h storage in the normal climate (50% relative humidity, 20° C.), of 1-4 MPa, particularly 1-2 MPa.

The elongation at break of the adhesive system or of the hot melt adhesive according to the present invention, also determined according to DIN 53455, after coating or application and 24-h storage in the normal climate (50% relative humidity, 20° C.), is in the range of 200-1200%, particularly 300-1000%, which allows the conclusion that the elasticity of the adhesive connection is advantageous.

Compared to similar EVA melt glues, the adhesive system according to the invention presents clearly reduced densities, connected with a reduced consumption. In general, the density of the adhesive system according to the invention at 20° C. has values $\leq 0.910$ g/cm$^3$, particularly $\leq 0.900$ g/cm$^3$, preferably $\leq 0.890$ g/cm$^3$.

As described above, the adhesive system according to the invention or the hot melt adhesive according to the invention is applied particularly in wood processing and furniture processing, and also in other fields (for example, in the transport industry, in the construction industry, in the textile industry, in the general assembly sector, etc.). The object of the present invention thus also relates to the use of the adhesive system according to the invention or the hot melt adhesive according to the invention in wood processing and furniture processing, or in the wood industry and furniture industry, and also in the transport and construction industry, in the textile industry as well as in the assembly sector. For example, the adhesive system according to the invention or the hot melt adhesive according to the invention can be used as a melt and/or assembly material in wood processing and furniture processing, for example, for purposes of profile coating or edge bonding. In comparison to similar EVA-based hot melts, the processing or the application is carried out at temperatures below 180° C., preferably below 175° C., advantageously below 170° C., so that the adhesive system according to the invention is also suitable for applications on relatively temperature sensitive substrates.

Multitude advantages are connected with the invention, as represented below purely as examples and for illustration:

As described above, the present invention has made it possible for the first time to produce nonreactive thermoplastic hot melt adhesives based on metallocene-catalytically manufactured copolymers based on at least two α-olefins, which can also be used particularly in wood processing and furniture processing, particularly because the adhesive systems according to the invention possess improved properties, particularly improved cohesion and adhesion, optimized viscosity for these special application purposes, improved initial adhesion, and improved physical strength after the application and cooling of the adhesive.

In addition, the open time of the hot melt adhesives according to the invention is clearly increased: in general it is at least 25 sec, preferably at least 30 sec, so that gluing in the field of wood processing and furniture processing can be carried out more simply or more appropriately for the application. To date no hot melt adhesives (hotmelts, thermal fusion adhesives) based on metallocene-catalytically manufactured polyolefins have been obtained, which could be used in applications outside the paper industry and packaging industry, particularly not in the field of the wood industry and furniture industry, because the systems that are known from the state of the art do not meet the higher requirements used in the field of wood and furniture processing with respect to cohesion, open time, heat resistance, and viscosity. It is only by the selection of special metallocene-catalytically manufactured polyolefins with different melt-flow indexes (MFIs) that, in the context of the present invention, hot melt adhesives are provided for the first time that allow applications in the wood industry and furniture industry, and also in the transport industry and the construction industry, in the textile industry, in the general assembly sector (for example, car and airplane industry, etc.) and similar fields. In principle, the hot melt adhesives according to the invention can be used in all fields, in that, in principle, cohesive hot melt adhesives with increased open times or increased processing times are confirmed.

In contrast to EVA-based hot melt adhesives, a clearly lower adhesive consumption is achieved with the adhesive system according to the invention because the density of the metallocene-catalytically manufactured polymers is approximately 10% under the value of corresponding EVA copolymers.

In contrast to comparable EVA-based hot melt adhesive systems, which, on the basis of the hydrolysis of the acetic acid ester, always present an acetic acid odor, the hot melt adhesives according to the invention are odorless.

Moreover, the hot melt adhesives according to the invention are not corrosive in contrast to EVA copolymers, which can cause corrosion as a result of the cleavage of acetic acid.

The thermal stability of the adhesive compound produced with the adhesive system according to the invention is superior to the stability of comparable EVA-systems. The adhesive system according to the invention presents particularly excellent adhesion; in general, the adhesion of the hot melt adhesive system according to the invention is improved in direct comparison with analogously formulated EVA-hot melt adhesives. In addition, the hot melt adhesives according to the invention present an improved low temperature resistance in comparison with comparable EVA-based hot melt adhesives, particularly because the glass transition temperature is lower than with EVA-copolymers.

In addition, with comparable cohesion, the viscosity of the hot melt adhesives according to the invention is lower than that of EVA hot melt adhesives. For this reason as well, the processing temperatures of the adhesive system according to the invention, namely at most 180° C., preferably at most 175° C., preferably at most 170° C., particularly preferably approximately 160° C., are clearly below those of EVA-based hot melt adhesives (180-210° C.).

Because of the above-mentioned properties of the adhesive system according to the invention, the adhesive system according to the invention, when applied or used, leads to less maintenance cost in comparison to conventional EVA-hot melt adhesives: the higher thermal stability, the absence of corrosive properties, and the relatively low processing temperatures drastically reduce the cost for cleaning and maintenance work with hot melt processing and application devices. Thus the availability of the installation and also the productivity increase.

The above-mentioned properties of the adhesive system according to the invention can be achieved only by using metallocene-catalytically manufactured polyolefins—and this only in the context of the combination and selection according to the invention. Such metallocene-catalytically manufactured polyolefins are characterized—in contrast to polyolefins manufactured by Ziegler-Natta catalysis—particularly by a narrow molecular weight distribution or polydispersity, associated with defined molecular structures. In particular, the metallocene-catalytically manufactured polyolefins contain no undesirable low molecular weight compounds, which can lead to unpleasant odors, and no undesirable high molecular compounds, which can lead to an undesirable increase in viscosity, instead, only the desired molecular mass ranges. The metallocene catalysis also allows one to set in a targeted manner different, other physicochemical properties, such as, temperature resistance, hardness, impact resistance, transparency, etc., so that the result is a corresponding uniform composition—which is not possible with the Ziegler/Natta catalysis. These findings contribute at least partially to an understanding of the performance of the adhesive system according to the invention.

Finally, the adhesive system according to the invention combines the properties of good cohesion and adhesion, on the one hand, and a good flexibility of the resulting adhesive connection, on the other hand.

Other embodiments, variants, variations, and advantages of the present invention can be determined and produced after a reading of the description by the person skilled in the art, without leaving the scope of the present invention.

The present invention is illustrated with reference to the following embodiment, which, however, in no way limits the present invention.

An EVA-based hot melt adhesive was manufactured and tested in comparison with a hot melt adhesive system according to the invention:

The composition of the two tested adhesives is represented in the following Table 1:

TABLE 1

| Raw material | Manufacturer | EVA-hot melt adhesive (weight parts) | Hot melt adhesive I according to the invention (weight parts) |
|---|---|---|---|
| Escorene ® UL 53019 | Exxon Mobil Chemical | 24.5 | — |
| Escorene ® UL 15028 | Exxon Mobil Chemical | 20.0 | — |
| Escorene ® UL 05540 | Exxon Mobil Chemical | 20.0 | — |
| Affinity ® EG 8200 | Dow Chemical | — | 10.0 |
| Affinity ® GA 1950 | Dow Chemical | — | 34.5 |
| Affinity ® GA 1900 | Dow Chemical | — | 20.0 |
| Irganox ® 1076 | Ciba Specialty Chemicals | 0.3 | 0.3 |
| Irganox ® TNPP | Ciba Specialty Chemicals | 0.2 | 0.2 |
| Escorez ® 5320 | Exxon Mobil Chemical | 35.0 | 35.0 |

The products of the Escorene® series are different ethylene/vinyl acetate copolymers with different melt-flow indexes (MFIs), while the products of the Affinity® series are different metallocene-catalytically manufactured $C_2/C_8$ poly-α-olefins with different melt-flow indexes (MFIs) (MFIs at 190° C.: Affinity® GA 1900 (1000 g/10 min); Affinity® GA 1950 (500 g/10 min); Affinity® EG 8200 (5 g/10 min)). The polyolefins used differ in addition in their densities (Affinity® GA 1900: 0.870 g/cm$^3$; Affinity® GA 1950: 0.874 g/cm$^3$; Affinity® EG 8200: 0.870 g/cm$^3$) as well as other physicochemical properties (viscosities, melting points, glass transition temperatures, molecular masses, etc.).

The adhesive properties achieved with the two adhesive systems in question are reproduced in the following Table 2:

TABLE 2

| | EVA-hot melt adhesive | Hot melt adhesive according to the invention |
|---|---|---|
| Viscosity at 160° C. [mPa · s] | 33,000 | 26,000 |
| Viscosity at 190° C. [mPa · s] | 13,000 | 12,000 |
| Softening point ring and ball [° C.] | 85 | 83 |
| Density [g/cm$^3$] | 0.95 | 0.90 |
| Odor | slightly pungent | Neutral |
| Stability after 8 h | Ring formation at 190° C. | No ring formation at 190° C. |
| Stability after 16 h | Ring formation at 190° C. | No ring formation at 190° C. |
| Mechanical properties | | |
| Maximum tensile strength [MPa] | 1.4 ± 0.1 | 1.3 ± 0.1 |
| Elongation at break [%] | 100 ± 30 | 700 ± 70 |

| Adhesion properties | RT | +6° C. | RT | +6° C. |
|---|---|---|---|---|
| U/O/700, Kröning, Hüllhorst, D (decorative paper film) | ++++ | ++++ | ++++ | ++++ |
| MysticSilber115, WKP, Unterensingen, D (decorative paper film) | ---- | ---- | ++++ | ++++ |
| Alkorcell Esche Silver, Alkor, Munich, D (thermoplastic PP film) | +++- | +--- | ++++ | +++- |
| Alkorcell Polar White, Alkor, Munich, D (thermoplastic PP film) | +++- | +--- | ++++ | +++- |

In comparison with the EVA-based hot melt adhesive, the adhesive system according to the invention presents clearly improved adhesion properties with different substrates (namely: decorative paper films and thermoplastic polypropylene films), while simultaneously presenting an improved elasticity or elongation at break of the produced adhesive connection after 24-h storage at room temperature (20° C.) at 50% relative humidity. The strength of the glue connection is improved both at room temperature and at low temperatures. The melt stabilities increased, and this while using identical stabilizers in identical quantities. Because of the low density of the hot melt adhesive according to the invention, the application quantity is reduced. The adhesive system according to the invention is thus clearly superior to the EVA-based adhesive system.

Two additional adhesives IIA and IIB according to the invention were formulated according to the recipe of the following Table 3. The hot melt adhesives IIA and IIB according to the invention differ from the adhesive I according to the invention in that the hot melt adhesives IIA and IIB according to the invention present no metallocene-catalytically manufactured $C_2/C_8$ poly-α-olefin with a melt-flow index (MFI) below 100, namely there is no Affinity® EG 8200 component.

TABLE 3

| | | Hot melt adhesives according to the invention (weight parts) | |
|---|---|---|---|
| Raw material | Manufacturer | IIA | IIB |
| Affinity ® EG 8200 | Dow Chemical | — | — |
| Affinity ® GA 1950 | Dow Chemical | 38.5 | 40.8 |
| Affinity ® GA 1900 | Dow Chemical | 22.2 | 23.7 |
| Irganox ® 1076 | Ciba Specialty Chemicals | 0.3 | 0.3 |
| Irgafos ® TNPP | Ciba Specialty Chemicals | 0.2 | 0.2 |
| Escorez ® 5320 | Exxon Mobil Chemical | 38.8 | 35.0 |

As shown in the following Table 4, the application properties, particularly the viscosity properties and the mechanical properties, such as, for example, the tensile strength and the elongation at break, as well as the initial strengths and the heat resistances with regard to gluing wood substrates with different decorative films of the hot melt adhesives IIA and IIB according to the invention were in fact sufficient or good, but less attractive than in the case of the hot melt adhesive I according to the invention. This shows that by the additional incorporation of a metallocene-catalytically manufactured $C_2/C_8$ poly-α-olefin with a lower melt-flow index (MFI), particularly one below 100, in a mixture with metallocene-catalytically manufactured $C_2/C_8$ poly-α-olefins with higher melt-flow index (MFI), particularly one above 500, a clear performance increase of the adhesive system according to the invention can be achieved.

The adhesive properties achieved with the adhesive systems IIA and IIB according to the invention are reproduced in the following Table 4:

TABLE 4

| | Hot melt adhesive IIA according to the invention | Hot melt adhesive IIB according to the invention |
|---|---|---|
| Viscosity at 160° C. [mPa·s] | 9300 | 10,000 |
| Viscosity at 190° C. [mPa·s] | 4300 | 4700 |
| Softening point ring and ball [° C.] | 78 | 79 |
| Mechanical properties | | |
| Maximum tensile strength [MPa] | 0.9 ± 0.1 | 1.0 ± 0.1 |
| Elongation at break [%] | 22 ± 6 | 210 ± 50 |

| Adhesion properties | RT | +6° C. | RT | +6° C. |
|---|---|---|---|---|
| U/O/700, Kröning, Hüllhorst, D (decorative paper film) | ++++ | ++++ | ++++ | ++++ |
| MysticSilber115, WKP, Unterensingen, D (decorative paper film) | ++++ | ++++ | ++++ | +++ |
| Alkorcell Esche Silver, Alkor, Munich, D (thermoplastic PP film) | ++++ | ++++ | ++++ | ++++ |
| Alkorcell Polar White, Alkor, Munich, D (thermoplastic PP film) | ++++ | ++++ | ++++ | +++− |

While the preferred embodiment of the invention has been illustrated and described in the foregoing description, the same is to be considered as illustrative and not restrictive in character, it being understood that all changes and modifications that come within the spirit of the invention are desired to be protected.

The invention claimed is:

1. Adhesive system based on a nonreactive thermoplastic hot melt adhesive, for use in wood processing and furniture processing, including a hot melt adhesive consisting essentially of:
   (A) a mixture of at least two mutually different metallocene-catalytically manufactured copolymers in each case of ethylene or propylene with at least one linear α-olefin, where the mutually different copolymers of the mixture present different melt-flow indexes (MFIs), where the mixture comprises metallocene-catalytically manufactured copolymers ("copolymers I") with a melt-flow index MFI≧500 g/10 min, on the one hand, and metallocene-catalytically manufactured copolymers ("copolymers II") with a melt-flow index MFI≦100 g/10 min, on the other hand, wherein the hot melt adhesive contains mixtures (A) of the different copolymers, with respect to the hot melt adhesive, in quantities of 40-80 wt % and wherein the weight-related copolymers I/copolymers II quantity ratio varies in the range from 6:1 to 5:1;
   (B) at least one additional polymer, with respect to the hot melt adhesive, in quantities of 0.001-30 wt %; and
   (C) at least one resin and/or at least one wax, with respect to the hot melt adhesive, in quantities of 0.001-50 wt %;
   (D) additional ingredients and additives selected from the group of stabilizers, aging protection agents, UV stabilizers, catalysts and solvents.

2. Adhesive system according to claim 1, where the hot melt adhesive contains the mixture (A) of the different copolymers, with respect to the hot melt adhesive, in quantities of 60-70 wt %.

3. Adhesive system according to claim 1, where the hot melt adhesive contains the additional polymer (B), with respect to the hot melt adhesive, in quantities of 1-25 wt %.

4. Adhesive system according to claim 1, where the hot melt adhesive contains the resin and/or the wax (C), with respect to the hot melt adhesive, in quantities of 0.01-40 wt %.

5. Adhesive system according to claim 1, where the metallocene-catalytically manufactured copolymers of the mixture (A) are in each case metallocene-catalytically manufactured copolymers of ethylene or propylene with at least one linear α-olefin, where, in the case of ethylene, the α-olefin is a C3-C20 α-olefin, which is selected from the group of propylene, isobutylene, 1-butene, 1-pentene, 1-hexene, 1-heptene, 4-methyl-1-pentene and 1-octene, and where, in the case of propylene, the α-olefin is a C4-C20 α-olefin, which is selected from the group consisting of isobutylene, 1-butene, 1-pentene, 1-hexene, 1-heptene, 4-methyl-1-pentene, and 1-octene.

6. Adhesive system according to claim 1, where the metallocene-catalytically manufactured copolymers of the mixture (A) are in each case metallocene-catalytically manufactured copolymers of ethylene with 1-octene and where the mixture (A) comprises different metallocene-catalytically manufactured ethylene/1-octene copolymers with different melt-flow indexes (MFIs).

7. Adhesive system according to claim 1, where, in the case where the mixture (A) contains more than two mutually different copolymers, at least two of the different copolymers present different melt-flow indexes (MFIs).

8. Adhesive system according to claim 1, where the different melt-flow indexes (MFIs) differ by at least 400 g/10 min.

9. Adhesive system according to claim 1, where the mixture (A) comprises metallocene-catalytically manufactured copolymers ("copolymers I") with melt flow indexes MFI>600 g/10 min, on the one hand, and metallocene catalytically manufactured copolymers ("copolymers II") with melt-flow indexes MFI<50 g/10 min, on the other hand.

10. Adhesive system according to claim 1, where the density of all the copolymers of the mixture (A) is lower than 0.900 g/cm3, and lies in the range of 0.840-0.900 g/cm3.

11. Adhesive system according to claim 1, where the mutually different copolymers of the mixture (A) present different densities, where, in case the mixture (A) contains more than two mutually different copolymers, at least two of the different copolymers present different densities and where the different densities differ from each other by at least 1.0×10-3 g/cm3.

12. Adhesive system according to claim 1, where the mutually different copolymers of the mixture (A) present different Brookfield viscosities, where, in case the mixture (A) contains more than two mutually different copolymers, at least two of the different copolymers present different Brookfield viscosities and where the different Brookfield viscosities at 177° C. differ by at least 1000 mPa·s.

13. Adhesive system according to claim 1, where the mutually different copolymers of the mixture (A) present different glass transition temperatures Tg, where, in case the mixture (A) contains more than two different copolymers, at least two of the different copolymers present different glass transition temperatures Tg and where the different glass transition temperatures Tg differ from each other by at least 2° C.

14. Adhesive system according to claim 1, where the mutually different copolymers of the mixture (A) present different melting point (DSC), where, in case the mixture (A) contains more than two mutually different copolymers, at least two of the different copolymers present different melting points (DSC) and where the different melting points (DSC) differ from each other by at least 2° C.

15. Adhesive system according to claim 1, where all the copolymers of the mixture (A) present a polydispersity Mw/Mn of 1.5-2.5 and where all the copolymers of the mixture (A) present mean molecular masses by weight Mw in the range of 2000-100,000 g/mol.

16. Adhesive system according to claim 1, where the additional polymer of the component (B) is selected from the group consisting of amorphous poly-α-olefins, thermoplastic polyurethanes, ethylene/(meth)acrylate copolymers, and ethylene/vinyl acetate copolymers as well as their mixtures.

17. Adhesive system according to claim 1, where the wax of the component (C) is selected from the group consisting of synthetic waxes; polyolefin waxes; polypropylene waxes; natural waxes; plant, animal or mineral waxes; and chemically modified waxes; as well as their mixtures.

18. Adhesive system according to claim 1, where the resin of the component (C) is selected from the group consisting of optionally modified hydrocarbon resins; aliphatic, aromatic or aliphatic-aromatic hydrocarbon resins and optionally modified terpene resins; natural resin esters; rosin esters and tall oil resin esters; as well as their mixtures.

19. Method for the use of the adhesive system according to claim 1 for the purpose of preparation of adhesive connections in wood processing and furniture processing, in the transport industry and in the construction industry, in the textile industry, and in the assembly sector.

20. Method according to claim 19, where the adhesive system is used as melt material or assembly material in wood processing and furniture processing.

21. Method according to claim 19, where the adhesive system is used for the purpose of preparing a profile coating or for preparing an edge bonding.

22. Method according to claim 19, where the adhesive system is applied at application temperatures below 180° C.

23. An adhesive system based on a nonreactive thermoplastic hot melt adhesive for use in wood processing and furniture processing, including a hot melt adhesive consisting essentially of:
(A) a mixture of at least two mutually different metallocene-catalytically manufactured copolymers in each case of ethylene or propylene with at least one linear α-olefin, where the mutually different copolymers of the mixture present different melt-flow indexes (MFIs), where the mixture comprises metallocene-catalytically manufactured copolymers ("copolymers I") with a melt-Dow index MFI$\geq$500 g/10 min, on the one hand, and metallocene-catalytically manufactured copolymers ("copolymers II") with a melt-flow index MFI$\leq$100 g/10 min, on the other hand, wherein the hot melt adhesive contains mixtures (A) of the different copolymers, with respect to the hot melt adhesive, in quantities of 40-80 wt % and wherein the weight-related copolymers I/copolymers II quantity ratio varies in the range from 6:1 to 5:1;
(B) optionally at least one additional polymer, with respect to the hot melt adhesive, in quantities of 0.001-30 wt %; and
(C) optionally at least one resin and/or at least one wax, with respect to the hot melt adhesive, in quantities of 0.001-50 wt %;
(D) additional ingredients and additives selected from the group of: stabilizers, aging-protection agents, UV stabilizers, catalysts, and solvents.

* * * * *